(12) United States Patent
Mbarek et al.

(10) Patent No.: US 12,142,995 B2
(45) Date of Patent: Nov. 12, 2024

(54) ALIGNMENT FEATURES IN ELECTROMAGNETIC RETARDER AND ASSEMBLY COMPRISING SUCH A RETARDER

(71) Applicant: TELMA, Saint Ouen l'aumone (FR)

(72) Inventors: Akafou Mbarek, Les Mureaux (FR); Romuald Belance, Deuil la Barre (FR); Nicolas Quennet, Cormeilles en Parisis (FR)

(73) Assignee: TELMA, Saint Ouen l'Aumone (FR)

( * ) Notice: Subject to any disclaimer, the term of this patent is extended or adjusted under 35 U.S.C. 154(b) by 263 days.

(21) Appl. No.: 17/672,209

(22) Filed: Feb. 15, 2022

(65) Prior Publication Data

US 2022/0286017 A1    Sep. 8, 2022

(30) Foreign Application Priority Data

Mar. 2, 2021   (FR) ...................................... 2102004

(51) Int. Cl.
*H02K 5/04* (2006.01)
*H02K 7/00* (2006.01)
*H02K 7/106* (2006.01)
*B60L 7/28* (2006.01)

(52) U.S. Cl.
CPC ............... *H02K 7/106* (2013.01); *H02K 5/04* (2013.01); *H02K 7/003* (2013.01); *B60L 7/28* (2013.01)

(58) Field of Classification Search
CPC .......... H02K 7/106; H02K 5/04; H02K 7/003; H02K 5/02; H02K 49/00; H02K 1/185; H02K 2213/03; B60L 7/28
See application file for complete search history.

(56) References Cited

U.S. PATENT DOCUMENTS 3,955,654 A * 5/1976 Lemonnier ............. F16D 57/04
                                                   123/195 A
4,853,573 A   8/1989 Wolcott
(Continued)

FOREIGN PATENT DOCUMENTS

EP        0970860 A2    1/2000
JP       H07101325 A    4/1995
SE        1750259 A1   10/2018

OTHER PUBLICATIONS

Written Opinion and Search Report issued Nov. 22, 2021 in connection with French patent application serial No. FR2102004.

*Primary Examiner* — Terrance L Kenerly
*Assistant Examiner* — Viswanathan Subramanian
(74) *Attorney, Agent, or Firm* — Patzik, Frank & Samotny Ltd.

(57) ABSTRACT

An assembly comprising a rotational driving mechanism of a drive shaft, and an electromagnetic retarder capable of slowing down the rotation of the drive shaft. The driving mechanism has a housing and a drive shaft extending along an axial direction. The electromagnetic retarder has a stator support fixed to the housing that has at least one relief extending along the axial direction, and in that the housing comprises at least one complementary relief cooperating with at least part of the relief of the stator support to fix the position of the stator support in relation to the housing along at least one direction contained in a plane perpendicular to the axial direction.

12 Claims, 6 Drawing Sheets

(56) References Cited

U.S. PATENT DOCUMENTS

| | | | |
|---|---|---|---|
| 6,700,265 B1* | 3/2004 | Bouissou | H02K 49/043 |
| | | | 310/107 |
| 2008/0035440 A1 | 2/2008 | Hoeller | |
| 2020/0403470 A1* | 12/2020 | Tzeng | H02K 7/1861 |

* cited by examiner

ALIGNMENT FEATURES IN ELECTROMAGNETIC RETARDER AND ASSEMBLY COMPRISING SUCH A RETARDER

CROSS-REFERENCE TO RELATED APPLICATIONS

This application claims the benefit of French Application Serial No. 2102004 filed Mar. 2, 2021, the entirety of which is hereby incorporated by reference.

TECHNICAL FIELD OF THE INVENTION

The present invention relates to the field of electromagnetic retarders.

BACKGROUND OF THE INVENTION

With reference to FIG. 1, the fixation of an electromagnetic retarder 6 onto a housing 8 of a driving mechanism is carried out by means of screws. Consequently, a clearance exists between the holes formed in the housing 8 and the holes formed in the stator support 18. This clearance can lead to an axial deviation of 1 to 3 millimeters between the Y-Y axis of the stator support and the X-X axis of the drive shaft. As the distance between the rotor 14 and the stator 20 is very low to ensure braking efficiency, this axial deviation may lead to irreversible degradation of the electromagnetic retarder.

A first aim of the present invention is to fix the position of the stator in relation to the rotor with a high degree of precision.

This fixation should advantageously be easy to perform and inexpensive.

BRIEF SUMMARY OF THE INVENTION

The object of the present invention is an assembly comprising a rotational driving mechanism of a drive shaft, and an electromagnetic retarder capable of slowing down the rotation of the drive shaft, the driving mechanism comprising a housing and a drive shaft that is capable of pivoting around an axis of rotation extending along an axial direction, said electromagnetic retarder comprising a rotor fixed to the drive shaft, a stator support fixed to the housing, and a stator integral with the stator support, characterized in that the stator support comprises at least one relief extending along the axial direction, and in that the housing comprises at least one complementary relief cooperating with at least part of the relief of the stator support to fix the position of the stator support in relation to the housing along at least one direction contained in a plane perpendicular to the axial direction.

The driving mechanism is at least one device among a gear box and a drive axle.

The characteristics specified in the following paragraphs may, optionally, be implemented. The characteristics may be implemented independently from each other or in combination with each other.

The relief comprises a ring having a point of the axis of rotation as its center.

Advantageously, this single relief is easy to produce. It enables the position of the stator support in relation to the housing to be fixed along two directions contained in a plane perpendicular to the axis of rotation.

The stator support comprises at least three reliefs situated around a point of the axis of rotation approximately 120° from each other.

Advantageously, said reliefs prevent any translation of the stator support along the Y and Z directions in relation to the housing, the Y and Z directions being perpendicular to each other and perpendicular to the axis of rotation.

The housing comprises at least three complementary reliefs situated around a point of the axis of rotation approximately 120° from each other.

Advantageously, the reliefs prevent any translation of the stator support along the Y and Z directions in relation to the housing, the Y and Z directions being perpendicular to each other and perpendicular to the axis of rotation.

Alternatively, the housing comprises a single complementary relief in the shape of a ring. The housing comprises at least one stud with an attachment hole configured to fix the stator support to the housing, said complementary relief being a projection extending in the extension of a cylindrical face of the at least one stud.

The ring comprises at least one attachment hole having a center, the distance between the center of said attachment hole and the edge of the ring being less than the diameter of a stud.

Each projection comprises a hollowed-out cylindrical face capable of bearing against a lateral face of the ring.

The distance between the center of the attachment hole of the housing and the hollowed-out cylindrical face is between 12 and 25 millimeters.

The stator support also comprises a peripheral surface surrounding the ring, and wherein the ring comprises a flat bearing surface on which part of the housing is supported, the peripheral surface being parallel to the bearing surface, the peripheral surface being offset along the axial direction in relation to the bearing surface by a distance of between 1 and 10 millimeters.

The disclosure also relates to an electromagnetic retarder capable of slowing down the rotation of a drive shaft of a driving mechanism, the drive shaft being capable of pivoting around an axis of rotation extending along an axial direction, said electromagnetic retarder comprising a rotor intended to be fixed to the drive shaft, a stator support intended to be fixed to the housing, and a stator integral with the stator support, characterized in that the stator support comprises at least one relief extending along the axial direction, said relief being capable of cooperating with at least one complementary relief of the housing to fix the position of the stator support in relation to the housing along at least one direction contained in a plane perpendicular to the axial direction.

DETAILED DESCRIPTION OF THE INVENTION

Figure 1:
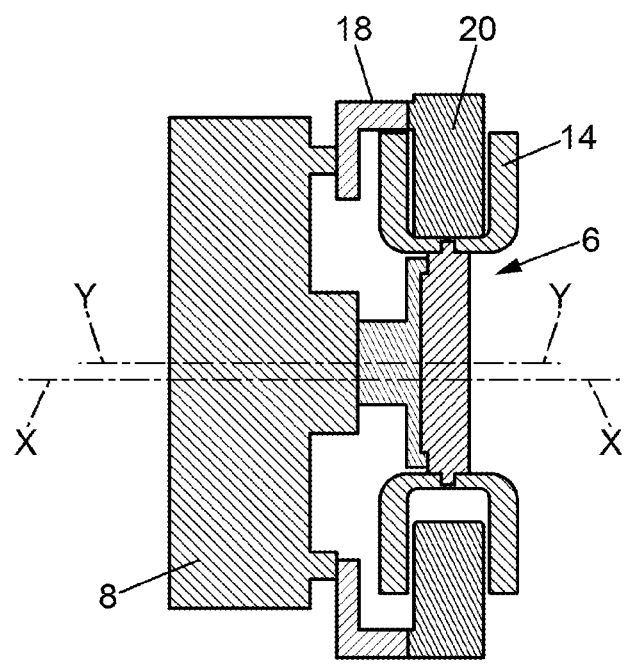
FIG. 1 is a cross-sectional schematic view of an electromagnetic retarder-driving mechanism assembly according to the prior art.

Assembly 2 according to the present disclosure is intended to be mounted in a vehicle, for example, a bus or heavy vehicle. With reference to FIG. 1, assembly 2 comprises a driving mechanism 4 and an electromagnetic retarder 6.

Figure 2:
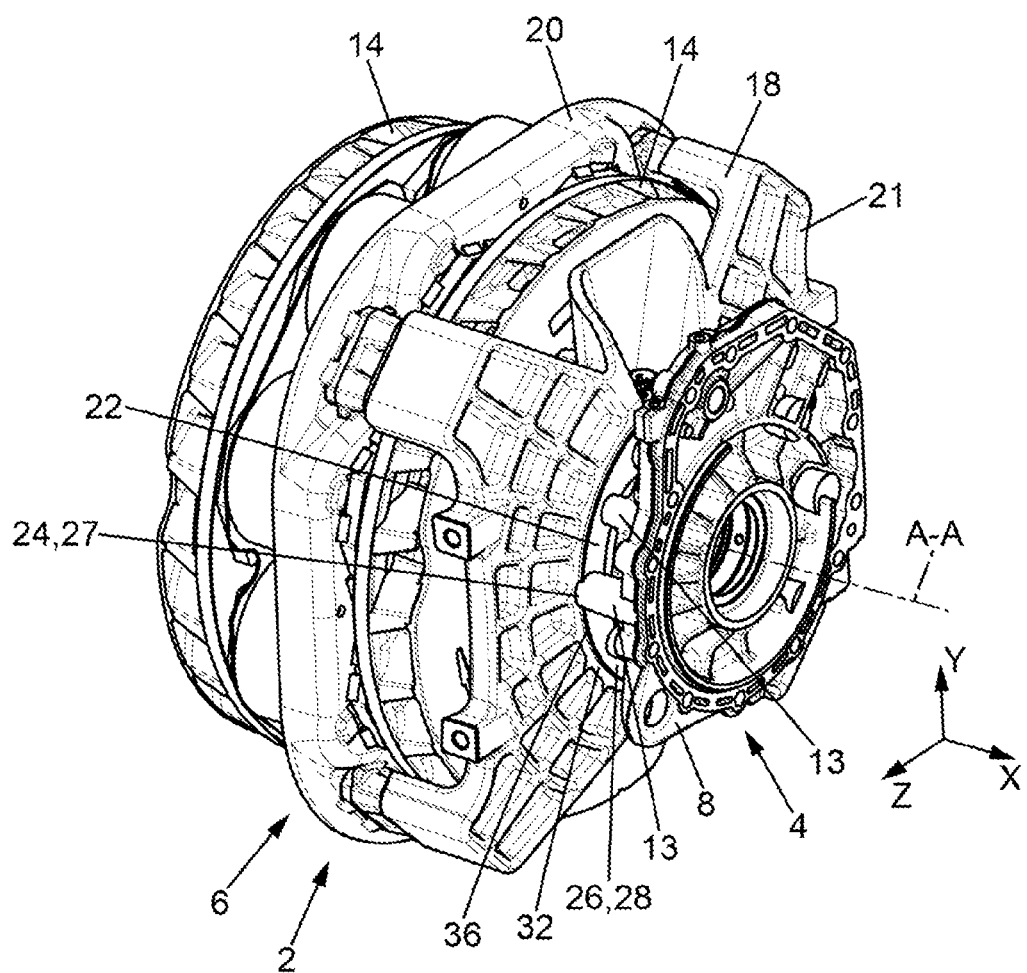
FIG. 2 is a perspective view of an electromagnetic retarder and part of a driving mechanism of an assembly according to the present invention.

Driving mechanism 4 is, for example, composed of a gear box or drive axle. With reference to FIG. 2, driving mechanism 4 comprises a housing 8 represented in part in the figures, an engine contained in the housing, a drive shaft 10 rotatably driven by the engine, and an output flange 12 fixed to one end of the drive shaft. Drive shaft 10 is rotatably driven around an axis of rotation A-A extending along an axial direction X. Housing 8 comprises a passage 11 traversed by drive shaft 10.

To fix stator support 18 to the housing, the housing comprises studs 13 extending along an axial direction X. Studs 13 are arranged around passage 11. Studs 13 are provided with threaded attachment holes 15.

Electromagnetic retarder 6 is capable of slowing down the rotation of drive shaft 10. To this effect, electromagnetic retarder 6 comprises a rotor 14 fixed to output flange 12, a stator support 18, screws 19 for fixing the stator support to housing 8, and a stator 20 integral with stator support 18.

Stator support 18 comprises an end plate 21 provided with a central hole traversed by drive shaft 10. End plate 21 is equipped with attachment through-holes 30, 31. Screws 19 are mounted in attachment holes 30, 31 of the stator support and in attachment holes 15 of the housing to fix the stator support to the housing. Stator support 18 also comprises a relief 22 capable of cooperating with at least part of a complementary relief 24 of the housing. Relief 22 and complementary relief 24 extend along the axial direction X.

Figure 4:
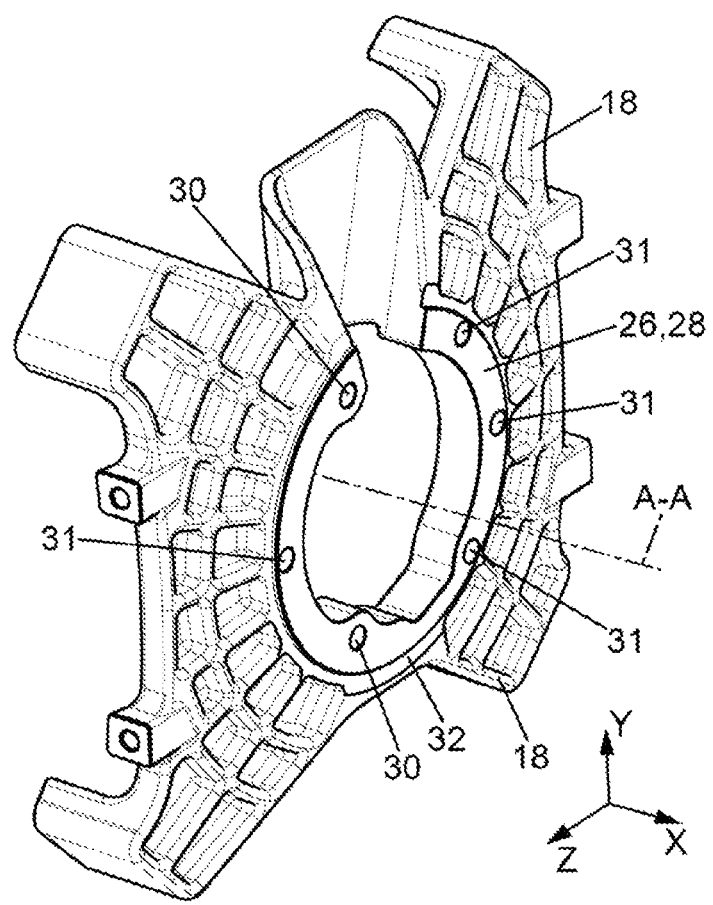
FIG. 4 is a perspective view of a stator support of the assembly represented in FIG. 2.
Figure 5:
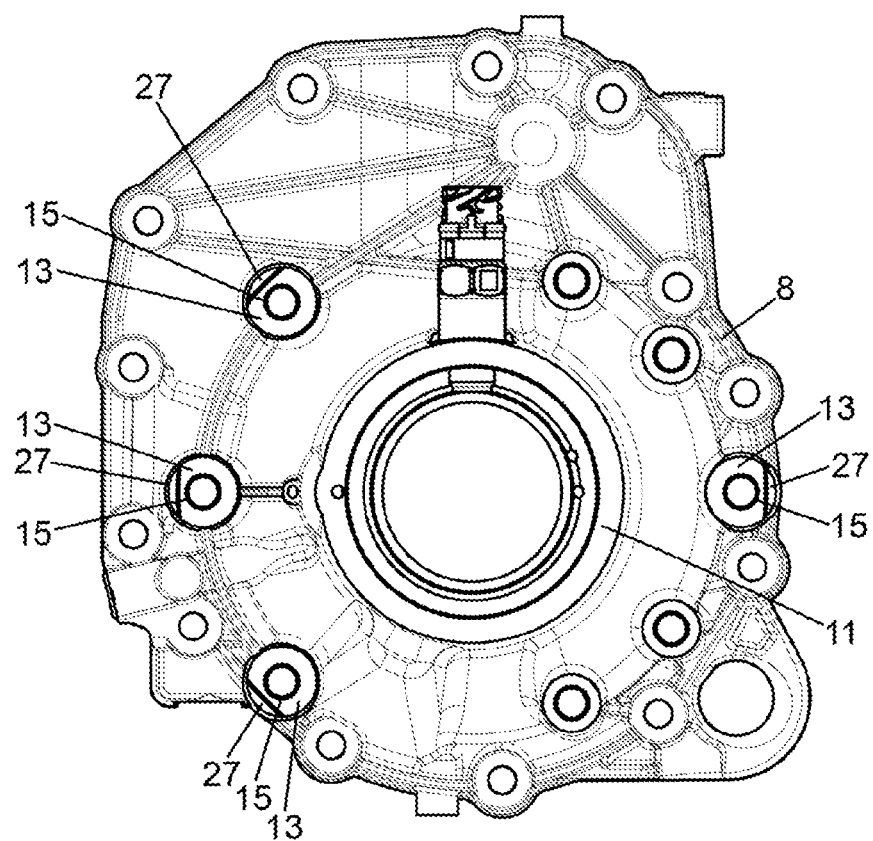
FIG. 5 is a view of a face of a housing of the assembly represented in FIG. 2, the electromagnetic retarder being fixed to this face.
Figure 6:
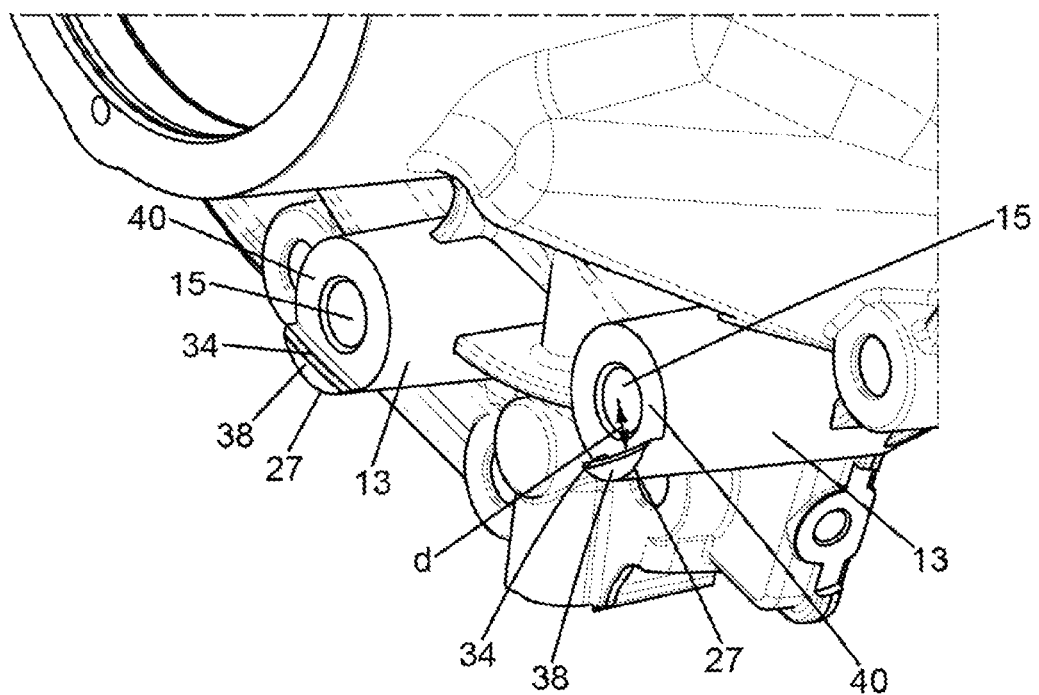
FIG. 6 is a perspective view of part of the face of the housing illustrated in FIG. 5.

In the embodiment represented in the figures, relief 22 comprises a ring 26 having a point of axis of rotation A-A as its center, and complementary relief 24 comprises at least three projections 27, illustrated in FIGS. 4 to 6. The cooperation between ring 26 and projections 27 enables the position of stator support 18 in relation to housing 8 to be fixed along two directions Y and Z contained in a plane perpendicular to axis of rotation A-A.

Figure 3:
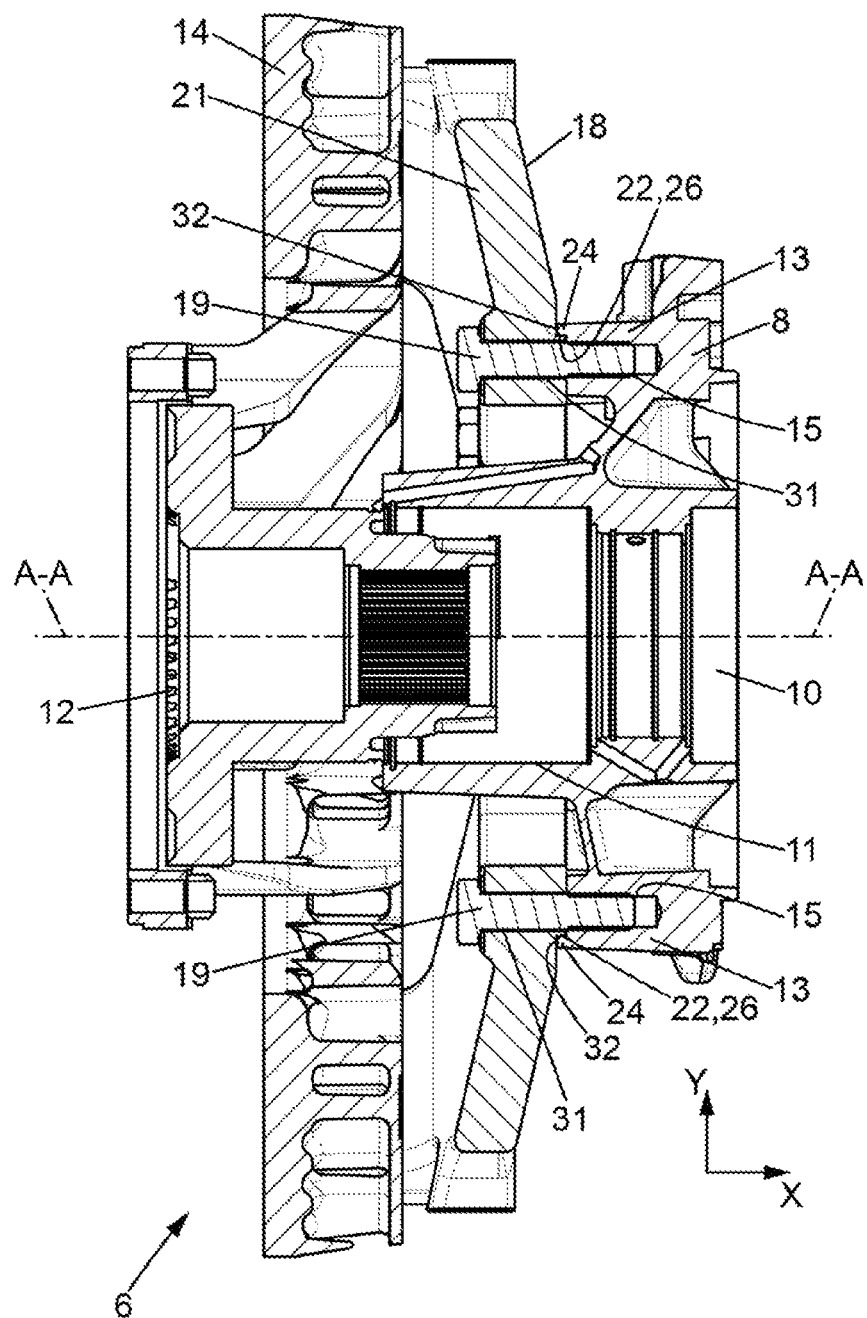
FIG. 3 is an axial sectional view of part of the driving mechanism, part of the rotor and of the stator support of the assembly represented in FIG. 2.

Stator support 18 also comprises a peripheral surface 32 surrounding ring 26. Peripheral surface 32 forms a space for receiving projections 27, as seen in FIGS. 2 and 3. In the embodiment represented, peripheral surface 32 is flat.

The face of the ring that extends in a plane perpendicular to axis of rotation A-A forms a bearing surface 28 on which part of the end face of studs 13 of the housing is supported. Peripheral surface 32 is parallel to bearing surface 28. Peripheral surface 32 is offset along the axial direction X in relation to the bearing surface by a distance of between 1 and 10 millimeters. This distance corresponds to the height of the projection and to a clearance. Attachment holes 30, 31 are provided on bearing surface 28. In the embodiment represented, four attachment holes 31 are situated near the outer edge of ring 26. For these four attachment holes denoted 31, the distance between the center of an attachment hole 31 and the edge of ring 26 is less than the diameter of a stud 13. For attachment holes denoted 30, this is any distance.

With reference to FIG. 6, projections 27 are advantageously arranged in the extension of a circular face of some studs 13. The circular face extended by a projection is situated opposite passage 11. Advantageously, projections 27 are created by removal of material, for example by machining.

In the embodiment, four studs 13 of stator support 18 are equipped with projections 27, as seen in FIG. 5. Three of these studs are situated around a point of axis of rotation A-A approximately 120° from each other. This arrangement blocks any translation of stator support 18 along any direction contained in a plane perpendicular to axis of rotation A-A. The fourth stud 13 equipped with a projection may be placed in any position. To obtain an exact fixation of the stator support in relation to the housing, only three projections 27 are necessary.

Each projection 27 comprises a hollowed-out cylindrical face 34 capable of bearing against a lateral face 36 of the ring. The hollowed-out cylindrical face 34 is concave on the attachment hole 15 side.

With reference to FIG. 6, the distance between the center of attachment hole 15 of the housing studs and hollowed-out cylindrical face 34 of the projection is advantageously between 12 and 25 millimeters. Therefore, hollowed-out cylindrical face 34 of the projections bears against lateral face 36 of the ring. The end face 40 of the stud that does not comprise the projection is supported on bearing surface 28 of ring 26. This cooperation increases the precision and stability of the assembly.

Alternatively, ring 26 surrounds peripheral surface 32.

Alternatively, screws 19 are replaced by pins.

Alternatively, ring 26 of the stator support is replaced by at least three reliefs 24 situated around a point of axis of rotation A-A approximately 120° from each other. These reliefs prevent any translation of the stator support along the Y and Z directions in relation to the housing.

Alternatively, ring 26 of the stator support is replaced by two reliefs 22 situated around a point of axis of rotation A-A approximately 120° from each other. These reliefs 22 prevent any translation of the stator support along the Y and Z directions in relation to the housing.

According to a less advantageous variant, ring 26 of the stator support is replaced by a relief 22 that blocks the movement of the stator along one direction.

Alternatively, only three studs 13 comprise projections 27, the studs with projections being situated around a point of axis of rotation A-A approximately 120° from each other. These three reliefs are sufficient for blocking any translation of the stator support along the Y and Z directions in relation to the housing.

According to a less advantageous variant, only two studs 13 comprise projections 27, the studs with projections being situated around a point of axis of rotation A-A approximately 120° from each other.

Alternatively, the housing comprises a single complementary relief in the shape of a ring instead of projections 27 and studs 13.

Alternatively, hollowed-out cylindrical faces 34 of projections 27 are replaced by a flat face having a normal passing through axis of rotation A-A.

The invention claimed is:

1. An assembly comprising a rotational driving mechanism of a drive shaft, and an electromagnetic retarder capable of slowing down the rotation of the drive shaft, the driving mechanism comprising a housing and a drive shaft that is capable of pivoting around an axis of rotation extending along an axial direction, said electromagnetic retarder comprising a rotor fixed to the drive shaft, a stator support fixed to the housing, and a stator integral with the stator support, wherein the stator support comprises a central ring extending along the axial direction, and in that the housing comprises at least three studs provided with an attachment hole configured to fix the stator support to the housing and at least three complementary reliefs cooperating with at least part of the central ring of the stator support to fix the position of the stator support in relation to the housing along at least one direction contained in a plane perpendicular to the axial direction, said complementary relief being a projection extending in the extension of a lateral face of the at least one stud.

2. The assembly according to claim 1, wherein the ring has a point of the axis of rotation as its center.

3. The assembly according to claim 2, wherein the three complementary reliefs are situated around a point of the axis of rotation approximately 120° from each other.

4. The assembly according to claim 3, wherein the stator support also comprises a peripheral surface surrounding the ring, and wherein the ring comprises a flat bearing surface on which part of the housing is supported, the peripheral surface being parallel to the bearing surface, the peripheral surface being offset along the axial direction in relation to the bearing surface by a distance of between 1 and 10 millimeters.

5. The assembly according to claim 1, wherein the three complementary reliefs are situated around a point of the axis of rotation approximately 120° from each other.

6. The assembly according to claim 5, wherein the stator support also comprises a peripheral surface surrounding the ring, and wherein the ring comprises a flat bearing surface on which part of the housing is supported, the peripheral surface being parallel to the bearing surface, the peripheral surface being offset along the axial direction in relation to the bearing surface by a distance of between 1 and 10 millimeters.

7. The assembly according to claim 1, wherein the ring comprises at least one attachment hole having a center, the distance between the center of said at least one attachment hole and the edge of the ring being less than the diameter of a stud.

8. The assembly according to claim 1, wherein each projection comprises a hollowed-out cylindrical face capable of bearing against a lateral face of the ring.

9. The assembly according to claim 8, wherein the distance between the center of the attachment hole of the housing and the hollowed-out cylindrical face is between 12 and 25 millimeters.

10. The assembly according to claim 1, wherein the stator support also comprises a peripheral surface surrounding the ring, and wherein the ring comprises a flat bearing surface on which part of the housing is supported, the peripheral surface being parallel to the bearing surface, the peripheral surface being offset along the axial direction in relation to the bearing surface by a distance of between 1 and 10 millimeters.

11. An assembly comprising a rotational driving mechanism of a drive shaft, and an electromagnetic retarder capable of slowing down the rotation of the drive shaft, the driving mechanism comprising a housing and a drive shaft that is capable of pivoting around an axis of rotation extending along an axial direction, said electromagnetic retarder comprising a rotor fixed to the drive shaft, a stator support fixed to the housing, and a stator integral with the stator support, characterized in that the stator support comprises at least three reliefs situated around a point of the axis of rotation and extending along the axial direction, and in that the housing comprises at least three studs provided with an attachment hole configured to fix the stator support to the housing and at least three complementary reliefs cooperating with at least part of the reliefs of the stator support to fix the position of the stator support in relation to the housing along at least one direction contained in a plane perpendicular to the axial direction, said complementary reliefs being projections extending in the extension of a lateral face of said studs.

12. The assembly according to claim 11, wherein the stator support comprises at least three reliefs situated around a point of the axis of rotation approximately 120° from each other.

* * * * *